Aug. 30, 1927.

E. A. FORSBERG

EDGE FILTER

Filed Sept. 4, 1924

1,640,698

WITNESS:
Rob: R. Kitchel

INVENTOR
Erik August Forsberg
BY
Busser and Harding
ATTORNEYS.

Patented Aug. 30, 1927.

1,640,698

UNITED STATES PATENT OFFICE.

ERIK AUGUST FORSBERG, OF STOCKHOLM, SWEDEN, ASSIGNOR TO THE DE LAVAL SEPARATOR COMPANY, OF NEW YORK, N. Y., A CORPORATION OF NEW JERSEY.

EDGE FILTER.

Application filed September 4, 1924, Serial No. 735,768, and in Great Britain September 18, 1923.

This invention has reference to filters or apparatus for separating solid substances, such as small particles, from liquids, or fluids from fluids, of the kind known as "edge filters": namely, filters comprising a multiplicity of laminæ of suitable material, the liquid or fluid that is acted upon or filtered being supplied or maintained under pressure; and it further relates to this type of filter in which a plurality of units or bodies are contained within a case, and in which the liquid passes through the filtering bodies from their exterior and passes out through a passage or passages within the exterior.

The object and effect of the present invention is to provide a filter or separating apparatus of the kind referred to, which is simple and relatively inexpensive, capable of being readily cleaned, and whose effective capacity may be maintained in use.

The apparatus comprises a plurality of bodies or units each consisting of elements or laminæ in the form of columns, suitably held or supported, with provision for the passage of liquid from the exterior to the interior core formed by such elements or laminæ, so that the separated matters remain on the exterior of the filtering bodies, from which they can be readily removed while in situ within the apparatus.

In the preferred construction herein described, the filtering bodies or columns may be of any suitable shape. They are supported between end plates or devices by connecting members extending through their centers, which members bind them and keep them under the pressure required. The units or bodies are fixed in position in the end plates or covers of the casing in which they are housed. The material of which the annular discs or laminæ are made, may be non-absorbent paper, or other suitable material. The edges of the elements of the units may be cleaned periodically by means of scraping devices movable longitudinally of the units and adjacent to the edges of the laminæ.

Figure 1:
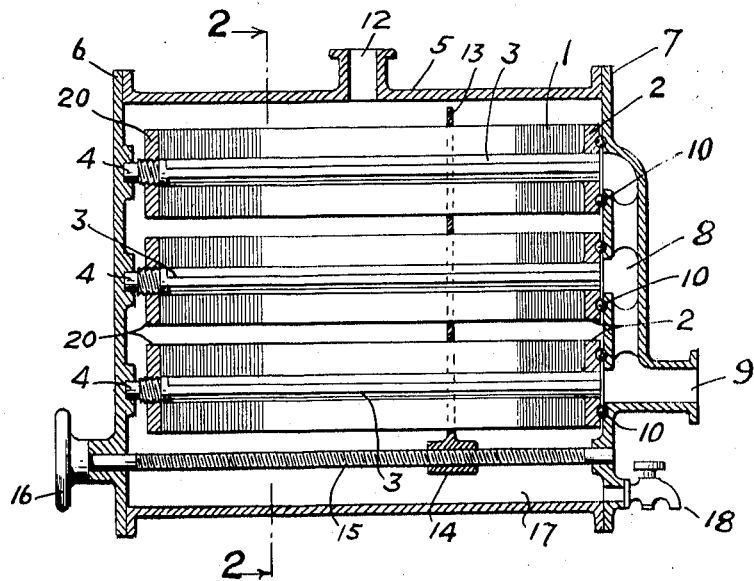
Figure 2:
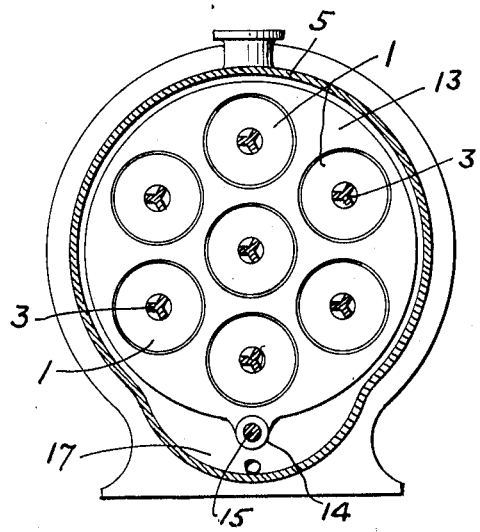

A filter of the character and comprising the features above generally described, and which represents one preferred embodiment of my invention, is illustrated in the accompanying drawings: Fig. 1 being a longitudinal section, and Fig. 2 a cross-section on the line 2—2 of Fig. 1. The filter shown in the drawings is of the horizontal kind: namely, one in which the axes of the units are horizontal.

Each filtering unit consists of a multiplicity of thin discs 1 of any suitable material, lying one upon the other, end plates 2 and 20 between which the discs 1 lie, and a central member 3, which may be in the form of a fluted rod, on which all the discs are strung. The flutes of the rods extend through the plates 2 at the liquid discharge end of the units. The plates 2 may be secured to, or sleeved on, the rod 3. The other ends of the rod are threaded and engage threaded holes in the other end plates 20, the rods being extended beyond the threads in the form of studs 4.

The casing consists of a body portion 5 and two end plates 6 and 7. Plate 7 is provided with a delivery chamber 8 from which leads a draw-off branch 9. Packing rings 10 are provided between the unit plates 2 and the plate 7 to make a seal or liquid-tight joint.

End plate 6 constitutes a removable cover which is provided internally with recesses corresponding in size with the studs 4 on the end of the rods 3. When the cover 6 is secured tight onto the body 5, it presses on the studs 4, thereby transmitting pressure to the packing rings between the plates 2 and plate 7, thereby providing a liquid-tight seal between these elements.

The body portion 5 has an entrance 12 for the liquid to be filtered.

The specific means shown for removing deposited matter on the exterior of a set of filtering discs consists of a perforated plate 13 carried on a nut 14, threaded on and supported by a screw-threaded rod 15, which is turnable in the end plates 6 and 7 and extends through plate 6 and is provided with a handle 16 by which the rod 15 may be rotated. The holes in the plate 13 are coincident with the peripheries of the disc units, so that by turning the threaded rod 15 and thereby moving the plate 13 longitudinally of the casing, the inner edge of the metal around the holes in the plate removes from the units the adhering matter which has been separated from the liquid. Such material will fall into a receptacle 17 formed in the bottom of the body 5, from which, at intervals, such material may be drawn off by means of a cock 18.

The means for removing deposited material from the exterior surface of the filter units need not be of the particular form shown, and while they must be movable relative to the units, the invention is not limited to a movement in a straight line parallel to the axis of the units, although it is of distinct advantage that the movement shall be in a general longitudinal direction at an angle to the planes of extension of the discs so as to more effectively dislodge the adherent material. Thus, brushes or fibres may be moved to and fro; or scrapers, brushes or the like of spiral form, or movable spirally around each unit, may be used. The deposit-removing means may be operable by hand or power, either continuously or intermittently.

My invention is not to be understood as limited to the precise details shown and described, nor to the horizontally disposed type of apparatus set forth.

It is evident that the capacity of filters of this kind is mainly dependent on the length of the edges at which the liquid enters between the filtering elements, where the entrance resistance occurs and the real filtering work takes place; and on keeping the filtering edges or surfaces as unobstructed as possible. The latter condition is especially important if it is required either that the filtering liquid be pure, or that the separated or filtered-out material shall not contain much liquid; in other words, maintenance of filtering capacity and efficiency are important if the separated or filtered-out material is valuable, and the object of the apparatus is to recover it; or if, on the other hand, the liquid is valuable and its loss is, therefore, required to be minimized.

Having now fully described my invention, what I claim and desire to protect by Letters Patent is:

1. An edge filter comprising a casing having two opposite end walls one of which is removable, a filter unit comprising a column of thin elements, a longitudinally extending member engaging said elements and provided with a plurality of flow channels extending therethrough, end plates at opposite ends of the columns, and means, operable in the placement of the removable end wall, to press the unit against the opposite end wall.

2. An edge filter comprising a casing having end walls, a filter comprising a column of thin elements, end plates at opposite ends of the column, a longitudinally extending member extending into one end plate and adjustably secured to the other end plate, one of said end walls adapted to engage the corresponding end of said member and by pressure against the same press the more remote end plate against the other end wall.

3. An edge filter comprising a casing having end walls, an inlet and an outlet, a filter comprising a column of thin elements, the exterior of the column being in communication with said inlet, end plates at opposite ends of the columns, a member extending longitudinally through said elements and providing a longitudinal channel for outflow of filtered liquid from the interior of said column, one of said end plates being secured to said member and the other end plate being orificed to receive said member and allow filtered liquid to flow toward said outlet, one of said end walls adapted to engage the corresponding end of said member and by pressure against the same press the more remote end plate against the other end wall.

4. An edge filter comprising a casing having two opposite end walls one of which is removable, a filter unit comprising a column of thin annular elements, end plates at opposite ends of the column, a member extending axially through the column, one end of said member being secured to one end plate and projecting beyond the same, the removable wall adapted, when applied to the casing, to engage the projecting end of said member and thereby press the end plate secured thereto against said column and, by the pressure transmitted through the column against the other end plate, press the latter against the other end wall of the casing.

5. An edge filter comprising a casing having an inlet for liquid to be filtered and an end wall having a plurality of outflow openings, a corresponding number of filter units, each comprising a multiplicity of thin discs with central aligning perforations aligning with the outflow openings and forming a column extending at right angles to said wall, members each extending through, and provided with a longitudinal flow passage extending through, the perforations of the discs of a column, end plates carried by said members on the ends thereof opposite the specified end wall, and a removable wall opposite the specified end wall adapted, when applied to the casing, to engage the ends of said members and thereby cause the end plates carried thereby to transmit pressure through the columns of discs against the first named end wall.

In testimony of which invention, I have hereunto set my hand, at Stockholm, Sweden, on this 21st day of August, 1924.

ERIK AUGUST FORSBERG.